United States Patent
Pingenot

(10) Patent No.: US 11,650,963 B2
(45) Date of Patent: May 16, 2023

(54) STORING SERIALIZED STRUCTURED DATA GENERICALLY IN A STANDARDIZED SERIALIZED DATA STRUCTURE

(71) Applicant: Google LLC, Mountain View, CA (US)

(72) Inventor: Joseph Pingenot, Mountain View, CA (US)

(73) Assignee: Google LLC, Mountain View, CA (US)

(*) Notice: Subject to any disclaimer, the term of this patent is extended or adjusted under 35 U.S.C. 154(b) by 56 days.

(21) Appl. No.: 17/319,012

(22) Filed: May 12, 2021

(65) Prior Publication Data

US 2022/0067001 A1 Mar. 3, 2022

Related U.S. Application Data

(60) Provisional application No. 63/072,927, filed on Aug. 31, 2020.

(51) Int. Cl.
*G06F 15/16* (2006.01)
*G06F 16/21* (2019.01)

(52) U.S. Cl.
CPC .................. *G06F 16/211* (2019.01)

(58) Field of Classification Search
None
See application file for complete search history.

(56) References Cited

U.S. PATENT DOCUMENTS

| | | | |
|---|---|---|---|
| 2012/0016901 A1* | 1/2012 | Agarwal | G06F 16/258 707/769 |
| 2013/0139134 A1* | 5/2013 | Burka | G06F 9/4493 717/153 |
| 2020/0133967 A1* | 4/2020 | Shukla | G06F 16/3334 |
| 2020/0250295 A1* | 8/2020 | Padmanabhan | G06F 21/64 |

OTHER PUBLICATIONS

International Search Report, Application No. PCT/US2021/032101, dated Jul. 5, 2021, 15 pages.
Pourhabibi et al. "Optimus Prime: Accelerating Data Transformation in Servers," Mar. 9, 2020, 14 pages.

* cited by examiner

*Primary Examiner* — Alex Gofman
(74) *Attorney, Agent, or Firm* — Hontgman LLP; Brett A. Krueger

(57) ABSTRACT

A method for storing serialized structured data generically in a standardized serialized data structure. The method includes obtaining structured data that includes one or more field pairs and transcoding the structured data into serialized self-describing data. Each field pair includes a corresponding field identifier and a field value associated with the corresponding field identifier. The serialized self-describing data includes one or more self-describing data portions each representing a corresponding one of the one or more field pairs. Each self-describing portion of the one or more self-describing portions includes a first series of bits representing the corresponding field identifier, and a second series of bits representing the field value associated with the corresponding field identifier. The method also includes transmitting the serialized self-describing data to a remote entity.

20 Claims, 6 Drawing Sheets

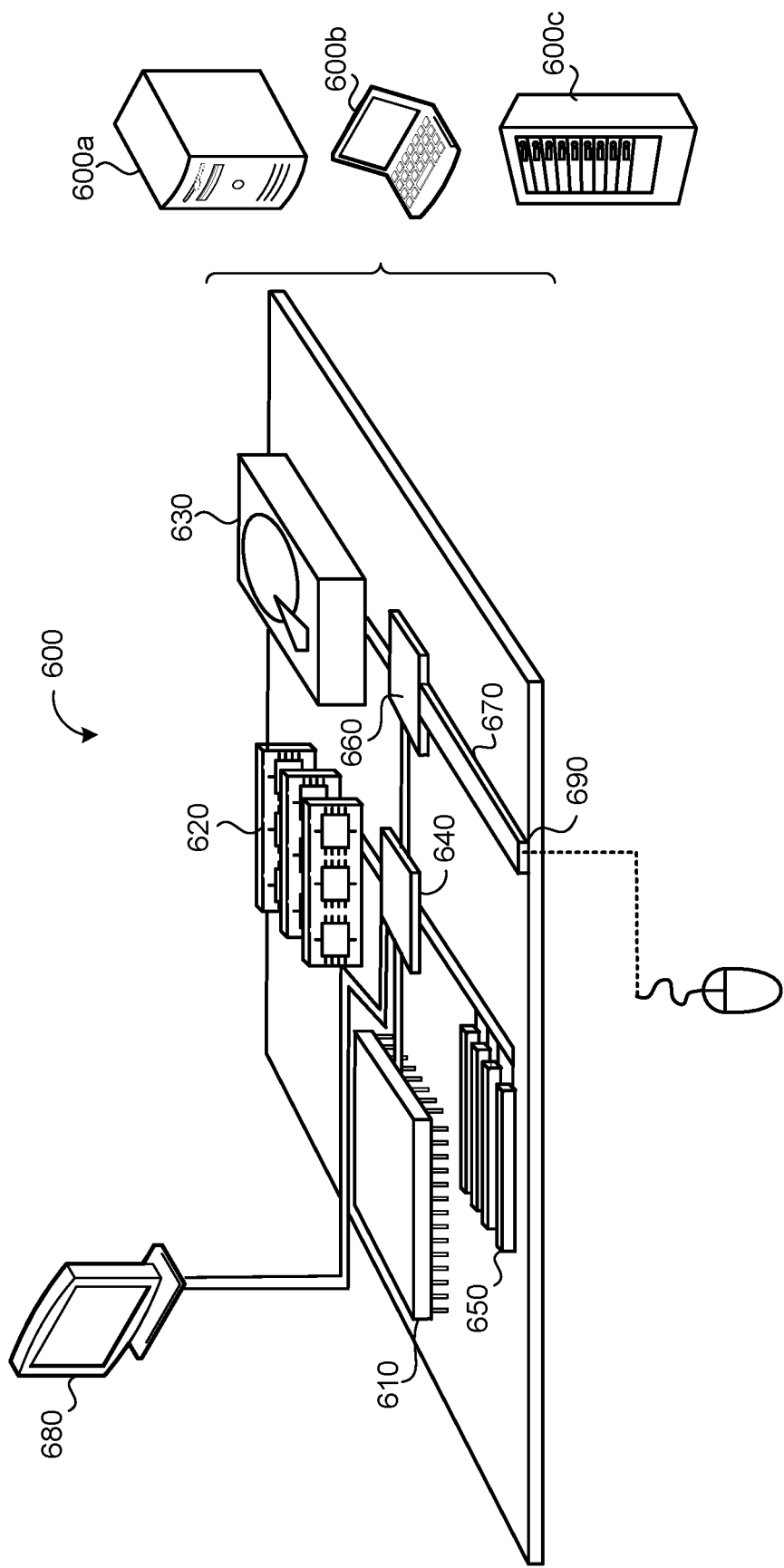

STORING SERIALIZED STRUCTURED DATA GENERICALLY IN A STANDARDIZED SERIALIZED DATA STRUCTURE

CROSS REFERENCE TO RELATED APPLICATIONS

This U.S. Patent Application claims priority under 35 U.S.C. § 119(e) to U.S. Provisional Application 63/072,927, filed on Aug. 31, 2020. The disclosure of this prior application is considered part of the disclosure of this application and is hereby incorporated by reference in its entirety.

TECHNICAL FIELD

This disclosure relates to storing serialized structured data generically in a standardized serialized data structure.

BACKGROUND

Structured data is used pervasively to provide information between different software applications. Generally, before communication between different entities, the data must be serialized into a series of bits. Often, serialized data structures are not self-describing. That is, the serialized data does not include the information necessary to understand or decode the message and instead, the recipient must have access to an independent specification that includes the information in order to decode the message.

SUMMARY

One aspect of the present disclosure provides a computer-implemented method that when executed on data processing hardware causes the data processing hardware to perform operations for storing serialized structured data generically in a standardized serialized data structure. The operations include obtaining structured data that includes one or more field pairs and transcoding the structured data into serialized self-describing data. Each field pair includes a corresponding field identifier and a field value associated with the corresponding field identifier. The serialized self-describing data includes one or more self-describing data portions each representing a corresponding one of the one or more field pairs. Each self-describing portion of the one or more self-describing portions includes a first series of bits representing the corresponding field identifier, and a second series of bits representing the field value associated with the corresponding field identifier. The operations also include transmitting the serialized self-describing data to a remote entity.

Implementations of the disclosure may include one or more of the following optional features. In some implementations, the operations also include obtaining a data specification specifying field pairs of serialized non-self-describing data, receiving the serialized non-self-describing data, and transcoding the serialized non-self-describing data into the structured data using the data specification. In these implementations, transmitting the serialized self-describing data to the remote entity may cause the remote entity to: determine a routing path based on each of the one or more self-describing data portions each representing the corresponding one of the one or more field pairs of the structured data; transcode the serialized self-describing data to the serialized non-self-describing data; and transmit the serialized non-self-describing data based on the determined routing path. Optionally, transmitting the serialized self-describing data to the remote entity may cause the remote entity to: transform the serialized self-describing data based on each of the one or more self-describing data portions each representing the corresponding one of the one or more field pairs of the structured data; transcode the transformed serialized self-describing data to new serialized non-self-describing data; and transmit the new serialized non-self-describing data to a second remote entity. In some examples, the serialized non-self-describing data includes a Protocol Buffer. Here, the serialized self-describing data may include a transcoding of the Protocol Buffer of the non-self describing data into another Protocol Buffer.

In some implementations, the field identifier in each field pair of the one or more field pairs includes a length-delimited variable length integer and/or the field value in each field pair of the one or more field pairs includes at least one variable length integer. In some examples, transcoding the structured data into serialized self-describing data includes, for each field pair, selecting a field type representative of the corresponding field value. The field type may include one of: a 32-bit integer, a 64-bit integer, a Boolean, or a string. The serialized self-describing data may further include metadata. Here, the metadata may include a checksum to verify the integrity of the serialized self-describing data.

Another aspect of the present disclosure provides a system for storing serialized structured data generically in a standardized serialized data structure. The system includes data processing hardware and memory hardware in communication with the data processing hardware and storing instructions that when executed on the data processing hardware cause the data processing hardware to perform operations. The operations include obtaining structured data that includes one or more field pairs and transcoding the structured data into serialized self-describing data. Each field pair includes a corresponding field identifier and a field value associated with the corresponding field identifier. The serialized self-describing data includes one or more self-describing data portions each representing a corresponding one of the one or more field pairs. Each self-describing portion of the one or more self-describing portions includes a first series of bits representing the corresponding field identifier, and a second series of bits representing the field value associated with the corresponding field identifier. The operations also include transmitting the serialized self-describing data to a remote entity.

This aspect of the disclosure may include one or more of the following optional features. In some implementations, the operations also include obtaining a data specification specifying field pairs of serialized non-self-describing data, receiving the serialized non-self-describing data, and transcoding the serialized non-self-describing data into the structured data using the data specification. In these implementations, transmitting the serialized self-describing data to the remote entity may cause the remote entity to: determine a routing path based on each of the one or more self-describing data portions each representing the corresponding one of the one or more field pairs of the structured data; transcode the serialized self-describing data to the serialized non-self-describing data; and transmit the serialized non-self-describing data based on the determined routing path. Optionally, transmitting the serialized self-describing data to the remote entity may cause the remote entity to: transform the serialized self-describing data based on each of the one or more self-describing data portions each representing the corresponding one of the one or more field serialized self-describing data to new serialized non-self-describing data; and transmit the new serialized non-self-describing data to a second remote entity. In some examples, the serialized non-self-describing data includes a Protocol Buffer. Here, the serialized self-describing data may include a transcoding of the Protocol Buffer of the non-self describing data into another Protocol Buffer.

In some implementations, the field identifier in each field pair of the one or more field pairs includes a length-delimited variable length integer and/or the field value in each field pair of the one or more field pairs includes at least one variable length integer. In some examples, transcoding the structured data into serialized self-describing data includes, for each field pair, selecting a field type representative of the corresponding field value. The field type may include one of: a 32-bit integer, a 64-bit integer, a Boolean, or a string. The serialized self-describing data may further include metadata. Here, the metadata may include a checksum to verify the integrity of the serialized self-describing data.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6 is a schematic view of an example computing device that may be used to implement the systems and methods described herein.

Like reference symbols in the various drawings indicate like elements.

DETAILED DESCRIPTION

In an increasingly computerized and networked world, structured data is frequently used to pass information between systems and applications. Transmission of messages to other systems (e.g., via a network) typically requires serialization. Once serialized, the data may be self-describing or non-self-describing. A message with self-describing data includes all of the information (i.e., data and metadata) necessary to describe the format and meaning of the message. For example, self-describing data includes, for example, pairs of field identifiers and field values. In contrast, a message with non-self-describing data lacks the information necessary to determine the format and meaning of the message. For example, if a message includes a field identifier of "Employee ID" and a field value of "101," non-self-describing data may only include the value of "101" without the context provided by the field identifier "Employee ID." Non-self-describing data is frequently used due to, for example, reduced bandwidth requirements. However, self-describing data can be important to reduce coupling between systems or to facilitate independent evolution.

For example, Protocol Buffers are a common method for serializing structured data. Because Protocol Buffers are language-neutral and platform neutral, they are very useful for communicating information between different applications over a wire or for data storage. Protocol Buffers efficiently encode values of structured data, but not the associated field identifiers. Thus, Protocol Buffers generate non-self-describing serialized data. That is, there is no way to tell identifiers, meaning, or full data types of fields without an external specification. However, in some scenarios, it is beneficial to send messages that are self-describing. For example, a self-describing message may be inspected to determine a routing destination for the message based on the contents. While Protocol Buffers may be serialized to generate, for example, a string in order to become self-describing, this technique is not type-safe and is fragile.

Implementations herein are directed toward a system storing serialized structured data generically in a standardized serialized data structure (e.g., a Protocol Buffer). The system obtains structured data that includes one or more field pairs. Each field pair includes a corresponding field identifier and a field value associated with the field identifier. The system transcodes the structured data into serialized self-describing data that includes one or more self-describing portions that each include a first series of bits representing a corresponding field identifier and a second series of bits representing the field value associated with the corresponding field identifier. The serialized self-describing data is transmitted to a remote entity.

Figure 1:
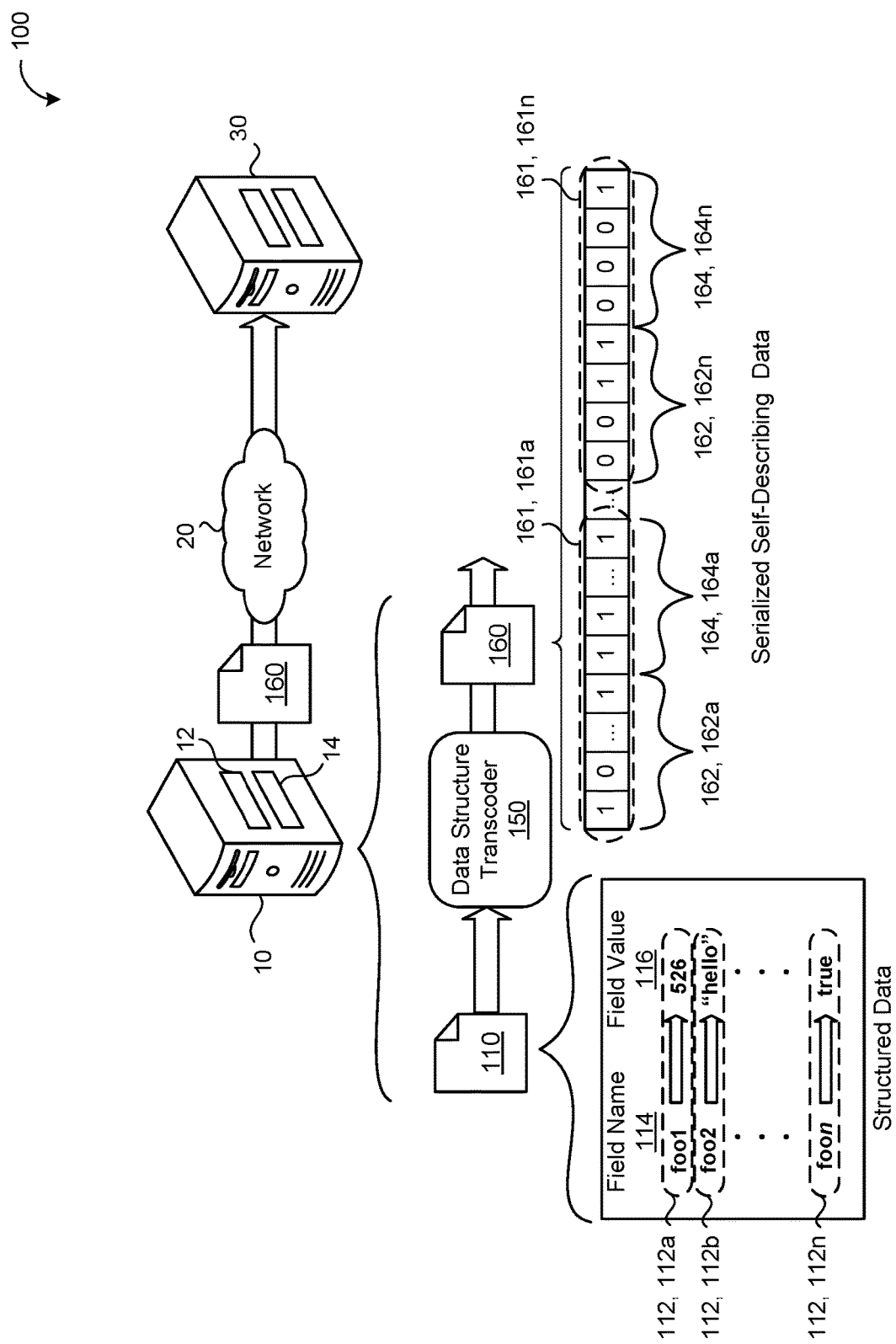
FIG. 1 is a schematic view of an example system for a standardized serialized data structure.

Referring to FIG. 1, in some implementations, an example system 100 includes a processing system 10. The processing system 10 may be a single computer, multiple computers, or a distributed system (e.g., a cloud environment) having fixed or scalable/elastic computing resources 12 (e.g., data processing hardware) and/or storage resources 14 (e.g., memory hardware). The processing system 10 executes a data structure transcoder 150 that obtains structured data 110. The data structure transcoder 150 receives the structured data 110, for example, from another processing system (via wired or wireless communication), via execution of program routines stored on memory hardware 14 of the processing system 10, and/or from a user via a user input (e.g., a keyboard and a mouse, a touch screen, etc.) to the processing system 10.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The structured data 110 includes one or more field pairs 112, 112*a-n*. Each field pair includes a field identifier 114 and an associated field value 116. The field identifier 114 identifies the field pair 112 while the field value 116 quantifies the field pair 112. The data structure transcoder 150 transcodes the structured data 110 into serialized self-describing data 160. In some examples, the data structure transcoder 150 selects a field type representative of the corresponding field value 116. For example, a field value 116 of "true" may be represented as a field type of Boolean.

The field type includes, for example, 32-bit integers, 64-bit integers, Booleans, strings, arrays of integers, etc.

The serialized self-describing data 160 includes, for each field pair 112, a corresponding self-describing data portion 161, 161a-n. Each self-describing data portion 161 includes a first series of bits 162, 162a-n representing the field identifier 114 of the corresponding field pair 112 and a second series of bits 164, 164a-n representing the field value 116 of the associated field identifier 114. Because the field identifier 114 describes the field pair 112, the serialized data 160 is self-describing and does not require an external specification to understand the field values.

The processing system 10 transmits the serialized self-describing data 160 to a remote entity 30 via, for example, a network 20. The remote entity 30 may decode and process the serialized self-describing data 160 without the need to fetch an external specification (e.g., from the processing system 10).

Figure 2:
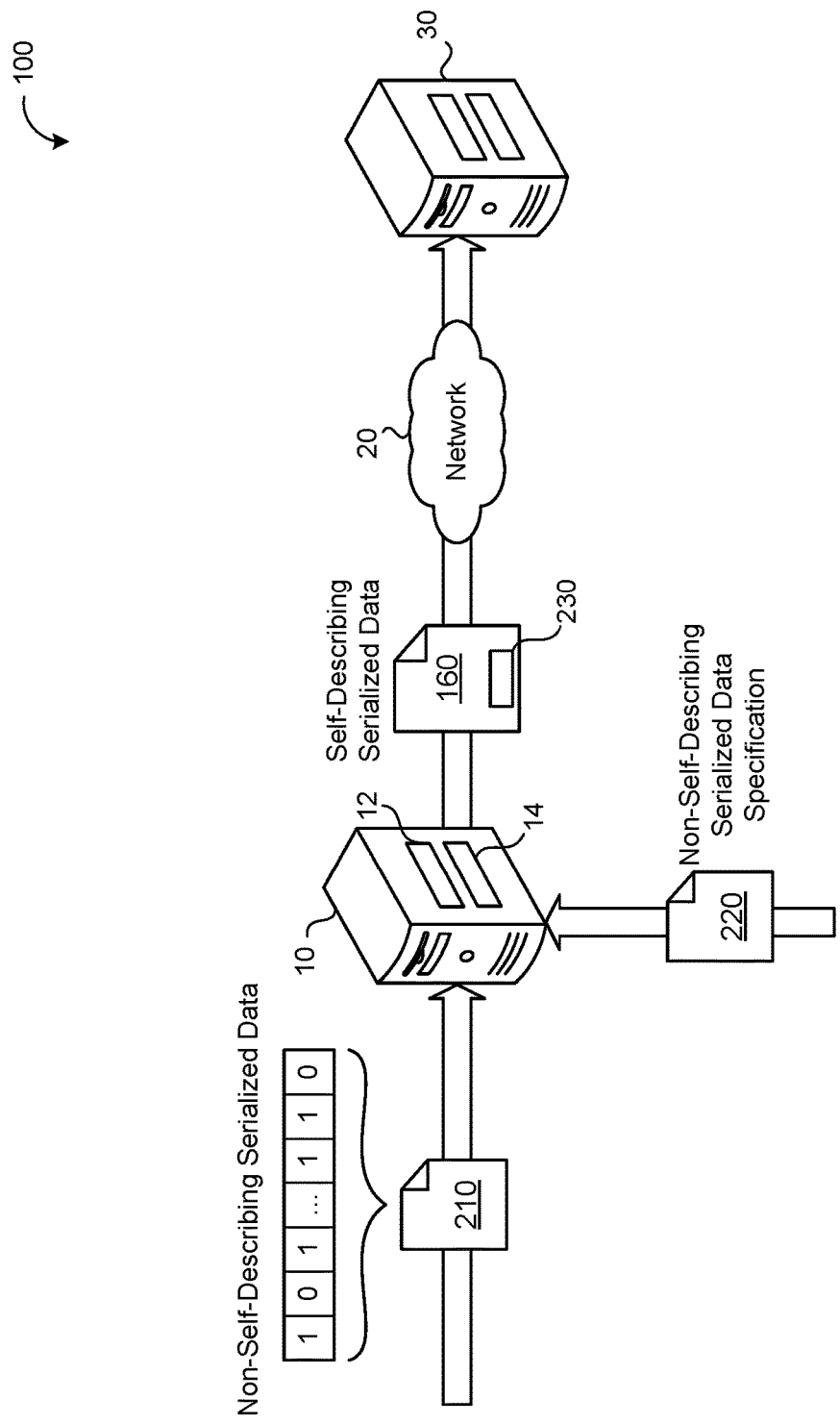
FIG. 2 is a schematic view of the example system that receives non-self-describing serialized data and an external specification.

Referring now to FIG. 2, in some examples, the processing system 10 receives non-self-describing serialized data 210 from a remote entity (e.g., another computer or server connected to the processing system 10 via a network). Because the data 210 is non-self-describing, the processing system 10 obtains a data specification 220 that specifies field pairs 112 of the serialized non-self-describing data 210. For example, the data specification 220 may specify the locations and field identifiers 114 associated with field values 116 of the non-self-describing serialized data 210. The processing system 10 may retrieve the data specification 220 from another remote entity (e.g., the remote entity that transmitted the non-self-describing serialized data 210). The processing system 10 may obtain the data specification 220 from a user (e.g., via a user input). Ideally, the processing system 10 obtains the data specification 220 prior to receiving the non-self-describing serialized data 210 and uses the data specification 220 to decode all received or obtained messages associated with the data specification 220. The processing system 10 may establish the association between the non-self-describing serialized data 210 and the data specification 220 based on identifying information within the non-self-describing serialized data 210 itself (e.g., metadata) and/or based on the sender.

The processing system may transcode, using the data specification 220, the non-self-describing serialized data 210 into the serialized self-describing data 160 shown in FIG. 1. The processing system 10 may transmit the self-describing serialized data 160 to the remote entity 30.

In some examples, the processing system 10 includes additional metadata 230 to the serialized self-describing data 160. The metadata may assist the remote entity 30 (or any other receiver) in transforming and/or validating the serialized self-describing data 160. For example, the metadata 230 includes a checksum, a cyclic redundancy check (CRC), a hash, a signature, etc. The remote entity 30 may use the metadata 230 to assist in transforming the serialized self-describing data 160 into another form. Additionally or alternatively, the remote entity 30 uses the metadata 230 to validate the self-describing data 160 (e.g., verify the data has not been changed or corrupted). The remote entity 30 may notify the processing system 10 (e.g., request retransmission) if an error is detected.

Figure 3:
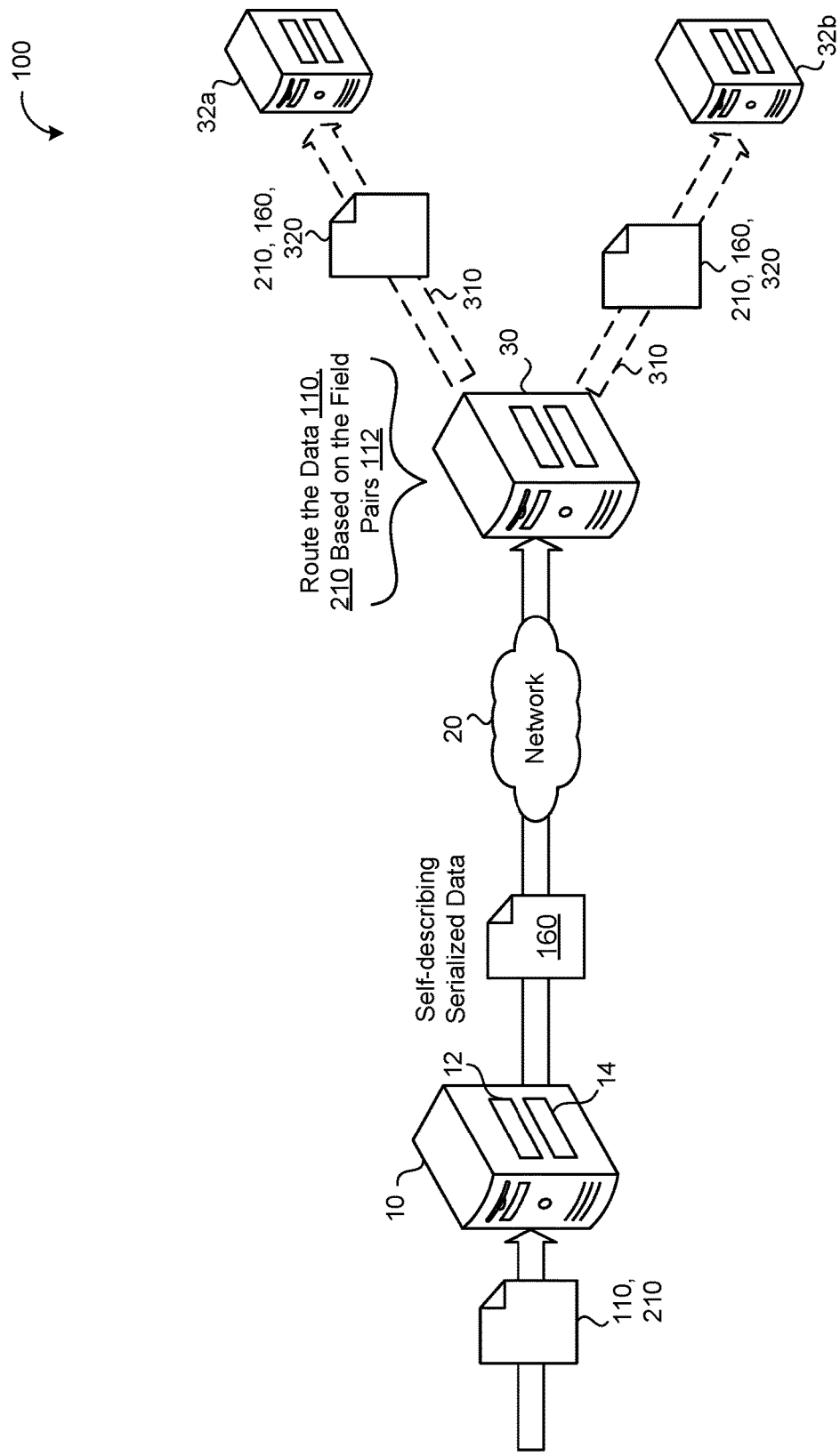
FIG. 3 is a schematic view of a remote entity routing serialized self-describing data.

Referring now to FIG. 3, in some implementations, the processing system 10 transcodes either obtained data 110 (e.g., from a user input) or received data 210 (e.g., from another networked computing device) into the serialized self-describing data 160 and transmits the serialized self-describing data 160 to the remote entity 30. In this example, the remote entity 30 may be a router or middlebox or other entity configured to route received messages to different destinations. Here, the remote entity 30 determines a routing path 310 of the data 110, 210 based on the field pairs 112. That is, the remote entity 30 may inspect the contents of the serialized self-describing data 160 (i.e., the field identifiers 114 and the field values 116 of the field pairs 112) to determine a destination for the data 110, 210. For example, when the field identifiers 114 and/or the field values 116 of the field pairs 112 satisfy certain criteria (e.g., includes certain field pairs 112, includes certain field values 116, one or more field values 116 satisfy one or more thresholds, etc.), the remote entity 30 may route the data 110, 210 to a second remote entity 32a. When the field identifiers 114 and/or the field values 116 of the field pairs 112 fail to satisfy the threshold, the remote entity 30 may route the data 110, 210 to a different second entity 32b. Additionally or alternatively, the remote entity 30 may perform other tasks with received messages (e.g., filtering, inspection, etc.).

The remote entity 30, in some examples, transcodes the serialized self-describing data 160 back to the serialized non-self-describing data 210 prior to transmitting the message to the second remote entity 32a-b based on the determined routing path 310. For example, the second remote entity 32a-b may execute legacy applications that expect or require serialized non-self-describing data 210 (e.g., transmits data that does not include the field identifiers 114). In this way, the system 100 allows for inspecting, routing, filtering, and other services of messages that typically are non-self-describing (e.g., Protocol Buffers). In other examples, the remote entity 30 transmits the self-describing serialized data 160 to the second remote entity 32a-b without transcoding the data back into a non-self-describing format (i.e., transmits data that includes both the field identifiers 114 and the field values 116 of the field pairs 112).

In yet other examples, the remote entity 30 transforms the serialized self-describing data 160 prior to transmitting the data to the second remote entity 32a-b. The remote entity may also transcode the transformed serialized self-describing data 160 into new serialized non-self-describing data 320. The remote entity 30 may transmit the new serialized non-self-describing data 320 to the second remote entity 32a-b. That is, alternatively or in addition to transcoding the serialized self-describing data 160 into the serialized non-self-describing data 210, the remote entity 30 may first transform the serialized self-describing data 160. For example, the remote entity 30 may change one or more field identifiers 114 or field values 116 of the field pairs 112 and/or the remote entity 30 may add or subtract field pairs 112. After the transformation, the remote entity 30 may transmit the transformed data 160 or alternatively transcode the transformed data 160 into the new serialized non-self-describing data 320.

Figure 4:
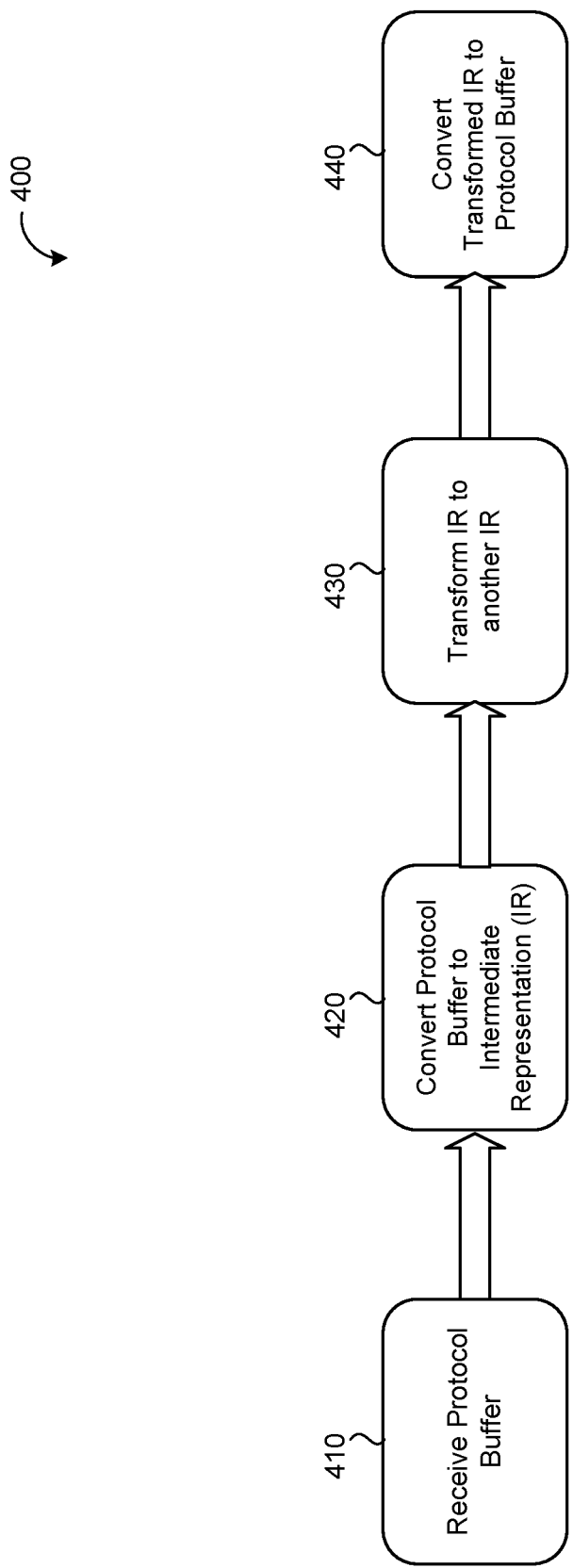
FIG. 4 is a schematic view of a block diagram for transforming a Protocol Buffer.

Referring now to FIG. 4, block diagram 400 illustrates how, in some implementations, the system 100 transforms a specific serialized data structure such as a Protocol Buffer (i.e., serialized non-self-describing data 210) that the processing system 10 receives from another remote entity or application. In some examples, the system receives a Protocol Buffer at 410. The Protocol Buffer is not self-describing. At 420, the system, using a data specification associated with the Protocol Buffer, converts the Protocol Buffer to an intermediate representation that is self-describing. The intermediate representation may be another Protocol Buffer that is configured to define other Protocol Buffers (i.e., a Protocol Buffer configured to encapsulate another Protocol Buffer).

That is, the system may transcode the Protocol Buffer into another Protocol Buffer configured to define other Protocol Buffers generically.

The system or a remote entity may transform the intermediate representation to another intermediate representation at 430. In some examples, the system performs the transformation with configuration instead of code (i.e., data-driven instead of coding in a specific language). The transformed intermediate representation may pass through intermediaries (e.g., routing services) and optimally inspected or filtered during transit. At 440, a remote entity may convert the transformed intermediate representation back into a binary Protocol Buffer (i.e., a non-self-describing Protocol Buffer) prior to transmission to the Protocol Buffer's final destination. When the system that receives the Protocol Buffer responds, the steps may be reversed to inform any top-level services of the result of any underlying operations.

Thus, the system 100 may represent a Protocol Buffer within a Protocol Buffer. This allows the system to create and transfer ad-hoc Protocol Buffers and manipulate and/or transform Protocol Buffers via a generalized interface. The system also allows Protocol Buffers to be manipulated and/or transformed during flight (e.g., while travelling from the source to the destination).

Figure 5:
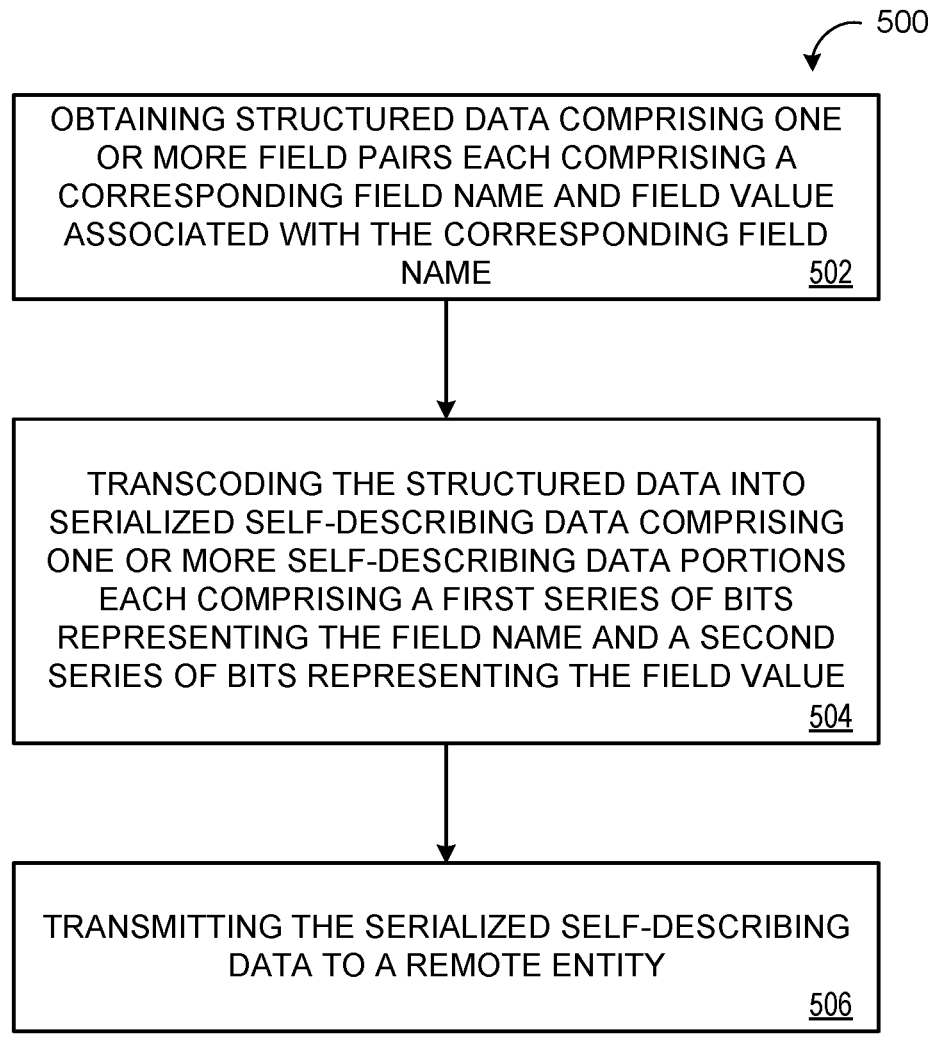
FIG. 5 is a flowchart of an example arrangement of operations for a method of storing serialized structured data generically in a standardized serialized data structure.

FIG. 5 is a flowchart of an exemplary arrangement of operations for a method 500 for storing serialized structured data generically in a standardized serialized data structure. The method 500, at operation 502 includes obtaining, at data processing hardware 12, structured data 110. The structured data 110 includes one or more field pairs 112. Each field pair 112 includes a corresponding field identifier 114 and a field value 116 associated with the corresponding field identifier 114. In some examples, each field identifier 114 includes a length-delimited variable length integer. Each field value 116 may include at least one variable length integer. Variable length integers allow the system to efficiently encode the field identifiers 114 and/or field values 116 when serializing the data 110, 210.

At step 504, the method 500 includes transcoding, by the data processing hardware 12, the structured data 110 into serialized self-describing data 160. The serialized self-describing data 160 includes one or more self-describing data portions 161 each representing a corresponding one of the one or more field pairs 112. Each self-describing portion 161 of the one or more self-describing portions 161 includes a first series of bits 162 representing the corresponding field identifier 114 and a second series of bits 164 representing the field value 116 associated with the corresponding field identifier 114. At step 506, the method 500 includes transmitting, by the data processing hardware 12, the serialized self-describing data 160 to a remote entity 30.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method that when executed on data processing hardware causes the data processing hardware to perform operations comprising:
   obtaining structured data comprising one or more field pairs, each field pair comprising a corresponding field identifier and a field value associated with the corresponding field identifier;
   transcoding the structured data into serialized self-describing data, the serialized self-describing data comprising one or more self-describing data portions each representing a corresponding one of the one or more field pairs, each self-describing portion of the one or more self-describing data portions comprising:
      a first series of bits representing the corresponding field identifier; and
      a second series of bits representing the field value associated with the corresponding field identifier;
   transmitting the serialized self-describing data to a remote entity;
   obtaining a data specification specifying field pairs of serialized non-self-describing data;
   receiving the serialized non-self-describing data; and
   transcoding, using the data specification, the serialized non-self-describing data into the structured data,
   wherein transmitting the serialized self-describing data to the remote entity causes the remote entity to:
      determine a routing path based on each of the one or more self-describing data portions each representing the corresponding one of the one or more field pairs of the structured data;
      transcode the serialized self-describing data to the serialized non-self-describing data; and
      transmit the serialized non-self-describing data based on the determined routing path.

2. The method of claim 1, wherein the serialized non-self-describing data comprises a Protocol Buffer.

3. The method of claim 2, wherein the serialized self-describing data comprises a transcoding of the Protocol Buffer of the non-self-describing data into another Protocol Buffer.

4. The method of claim 1, wherein the field identifier in each field pair of the one or more field pairs comprises a length-delimited variable length integer.

5. The method of claim 1, wherein the field value in each field pair of the one or more field pairs comprises at least one variable length integer.

6. The method of claim 1, wherein transcoding the structured data into serialized self-describing data comprises, for each field pair, selecting a field type representative of the corresponding field value.

7. The method of claim 6, wherein the field type comprises one of: a 32-bit integer, a 64-bit integer, a Boolean, or a string.

8. The method of claim 1, wherein the serialized self-describing data further comprises metadata.

9. The method of claim 8, wherein the metadata comprises a checksum to verify the integrity of the serialized self-describing data.

10. A computer-implemented method that when executed on data processing hardware causes the data processing hardware to perform operations comprising:
obtaining structured data comprising one or more field pairs, each field pair comprising a corresponding field identifier and a field value associated with the corresponding field identifier;
transcoding the structured data into serialized self-describing data, the serialized self-describing data comprising one or more self-describing data portions each representing a corresponding one of the one or more field pairs, each self-describing portion of the one or more self-describing data portions comprising:
a first series of bits representing the corresponding field identifier; and
a second series of bits representing the field value associated with the corresponding field identifier;
transmitting the serialized self-describing data to a remote entity;
obtaining a data specification specifying field pairs of serialized non-self-describing data;
receiving the serialized non-self-describing data; and
transcoding, using the data specification, the serialized non-self-describing data into the structured data,
wherein transmitting the serialized self-describing data to the remote entity causes the remote entity to:
transform the serialized self-describing data based on each of the one or more self-describing data portions each representing the corresponding one of the one or more field pairs of the structured data;
transcode the transformed serialized self-describing data to new serialized non-self-describing data; and
transmit the new serialized non-self-describing data to a second remote entity.

11. A system comprising:
data processing hardware; and
memory hardware in communication with the data processing hardware, the memory hardware storing instructions that when executed on the data processing hardware cause the data processing hardware to perform operations comprising:
obtaining structured data comprising one or more field pairs, each field pair comprising a corresponding field identifier and a field value associated with the corresponding field identifier;
transcoding the structured data into serialized self-describing data, the serialized self-describing data comprising one or more self-describing data portions each representing a corresponding one of the one or more field pairs, each self-describing portion of the one or more self-describing data portions comprising:
a first series of bits representing the corresponding field identifier; and
a second series of bits representing the field value associated with the corresponding field identifier; and
transmitting the serialized self-describing data to a remote entity;
obtaining a data specification specifying field pairs of serialized non-self-describing data;
receiving the serialized non-self-describing data; and
transcoding, using the data specification, the serialized non-self-describing data into the structured data,
wherein transmitting the serialized self-describing data to the remote entity causes the remote entity to:
determine a routing path based on each of the one or more self-describing data portions each representing the corresponding one of the one or more field pairs of the structured data;
transcode the serialized self-describing data to the serialized non-self-describing data; and
transmit the serialized non-self-describing data based on the determined routing path.

12. The system of claim 11, wherein the serialized non-self-describing data comprises a Protocol Buffer.

13. The system of claim 12, wherein the serialized self-describing data comprises a transcoding of the Protocol Buffer of the non-self-describing data into another Protocol Buffer.

14. The system of claim 11, wherein the field identifier in each field pair of the one or more field pairs comprises a length-delimited variable length integer.

15. The system of claim 11, wherein the field value in each field pair of the one or more field pairs comprises at least one variable length integer.

16. The system of claim 11, wherein transcoding the structured data into serialized self-describing data comprises, for each field pair, selecting a field type representative of the corresponding field value.

17. The system of claim 16, wherein the field type comprises one of: a 32-bit integer, a 64-bit integer, a Boolean, or a string.

18. The system of claim 11, wherein the serialized self-describing data further comprises metadata.

19. The system of claim 18, wherein the metadata comprises a checksum to verify the integrity of the serialized self-describing data.

20. A system comprising:
data processing hardware; and
memory hardware in communication with the data processing hardware, the memory hardware storing instructions that when executed on the data processing hardware cause the data processing hardware to perform operations comprising:
obtaining structured data comprising one or more field pairs, each field pair comprising a corresponding field identifier and a field value associated with the corresponding field identifier;
transcoding the structured data into serialized self-describing data, the serialized self-describing data comprising one or more self-describing data portions each representing a corresponding one of the one or more field pairs, each self-describing portion of the one or more self-describing data portions comprising:
a first series of bits representing the corresponding field identifier; and
a second series of bits representing the field value associated with the corresponding field identifier;

transmitting the serialized self-describing data to a remote entity;
obtaining a data specification specifying field pairs of serialized non-self-describing data;
receiving the serialized non-self-describing data; and
transcoding, using the data specification, the serialized non-self-describing data into the structured data,
wherein transmitting the serialized self-describing data to the remote entity causes the remote entity to:
transform the serialized self-describing data based on each of the one or more self-describing data portions each representing the corresponding one of the one or more field pairs of the structured data;
transcode the transformed serialized self-describing data to new serialized non-self-describing data; and
transmit the new serialized non-self-describing data to a second remote entity.

\* \* \* \* \*